(12) United States Patent
Asadi et al.

(10) Patent No.: US 10,673,945 B2
(45) Date of Patent: Jun. 2, 2020

(54) FRAMEWORK FOR DATA GEOCODING

(71) Applicant: SAP SE, Walldorf (DE)

(72) Inventors: Mohsen Asadi, Vancouver (CA); Jonathan Tiu, Surrey (CA); Lyndon Hiew, Richmond (CA); Christopher Tam, Vancouver (CA); Sae-Won Om, Vancouver (CA)

(73) Assignee: SAP SE, Walldorf (DE)

( * ) Notice: Subject to any disclaimer, the term of this patent is extended or adjusted under 35 U.S.C. 154(b) by 306 days.

(21) Appl. No.: 15/343,340

(22) Filed: Nov. 4, 2016

(65) Prior Publication Data

US 2018/0131763 A1 May 10, 2018

(51) Int. Cl.
*H04L 29/08* (2006.01)
*H04W 4/02* (2018.01)
*G06F 16/29* (2019.01)

(52) U.S. Cl.
CPC .......... *H04L 67/1097* (2013.01); *G06F 16/29* (2019.01); *H04L 67/18* (2013.01); *H04W 4/02* (2013.01)

(58) Field of Classification Search
CPC ...... H04L 67/18; H04L 67/1097; H04W 4/02; G06F 17/30241
See application file for complete search history.

(56) References Cited

U.S. PATENT DOCUMENTS

| | | | | |
|---|---|---|---|---|
| 8,538,679 | B1* | 9/2013 | Takyar | G01C 21/00 455/456.1 |
| 8,626,789 | B2* | 1/2014 | Jayanti | G06F 16/29 707/771 |
| 8,996,545 | B2* | 3/2015 | Chen | G06F 16/29 707/756 |
| 9,778,063 | B2* | 10/2017 | Holden | G01C 21/367 |
| 2004/0139049 | A1* | 7/2004 | Hancock | G01C 21/20 |
| 2009/0112816 | A1* | 4/2009 | Marlow | G06F 17/30241 |
| 2017/0293673 | A1* | 10/2017 | Purumala | H04L 67/1097 |

OTHER PUBLICATIONS

Adler, David. "IBM DB2 Spatial Extender—Spatial data within the RDBMS". Proceedings of the 27th VLDB Conference, Roma, Italy. pp. 1-4 (Year: 2001).*

* cited by examiner

*Primary Examiner* — John M Macilwinen
(74) *Attorney, Agent, or Firm* — Fountainhead Law Group P.C.

(57) ABSTRACT

Some embodiments provide a non-transitory machine-readable medium that stores a program. The program receives, from a client device, a request to geo-enrich data that includes a set of data and a set of location data associated with the set of data. The program also selects a geocoder from a plurality of different geocoders based on the set of location data associated with the set of data. The program further geo-enriches the set of location data using the selected geocoder.

20 Claims, 9 Drawing Sheets

FRAMEWORK FOR DATA GEOCODING

BACKGROUND

Today, with the cost of data storage declining, the amount of data being generated, managed, and stored by computing systems is increasing. A good amount of data may include data that describes a location (e.g., an address, a city, a state, a country, a postal zip code, etc.). Some computing systems may perform geocoding operations on such data to determine a location on the surface of the Earth associated with the described location. Geocoded data may useful in some other aspects and/or application. For example, the geocoded data may be used for mapping purposes, business intelligence, spatial analysis, etc.

SUMMARY

In some embodiments, a non-transitory machine-readable medium stores a program. The program receives, from a client device, a request to geo-enrich data that includes a set of data and a set of location data associated with the set of data. The program also selects a geocoder from a plurality of different geocoders based on the set of location data associated with the set of data. The program further geo-enriches the set of location data using the selected geocoder.

In some embodiments, the program further sends the geo-enriched data to the client device. The request may specify to persist the geo-enriched data. The program may further store the geo-enriched data for later use. In some embodiments, the request is a first request. The program further receives, from the client device, a second request for the geo-enriched data. In response to the second request, the program also retrieves the stored geo-enriched data and sending the retrieved geo-enriched data to the client device.

In some embodiments, the request from the client device includes a file that the client device received through a drag and drop operation performed with the file on a map in a graphical user interface (GUI) presented on a display of the client device. The file may include the set of data and the set of location data. The plurality of different geocoders may include an internal geocoder and a set of external geocoding services. The location data may include latitude and longitude coordinate pairs. Selecting the geocoder from the plurality of different geocoders may include selecting the internal geocoder as the selected geocoder. The location data may include data other than latitude and longitude coordinate pairs. Selecting the geocoder from the plurality of different geocoders may include selecting an external geocoding service from the set of external geocoding services as the selected geocoder.

In some embodiments, a method receives, from a client device, a request to geo-enrich data that includes a set of data and a set of location data associated with the set of data. The method also selects a geocoder from a plurality of different geocoders based on the set of location data associated with the set of data. The method further geo-enriches the set of location data using the selected geocoder.

In some embodiments, the method further sends the geo-enriched data to the client device. The request may specify to persist the geo-enriched data. The method may further storing the geo-enriched data for later use. In some embodiments, the request is a first request. The method further receives, from the client device, a second request for the geo-enriched data. In response to the second request, the method also retrieves the stored geo-enriched data and sending the retrieved geo-enriched data to the client device.

In some embodiments, the request from the client device includes a file that the client device received through a drag and drop operation performed with the file on a map in a graphical user interface (GUI) presented on a display of the client device. The file may include the set of data and the set of location data. The plurality of different geocoders may include an internal geocoder and a set of external geocoding services. The location data may include latitude and longitude coordinate pairs. Selecting the geocoder from the plurality of different geocoders may include selecting the internal geocoder as the selected geocoder. The location data may include data other than latitude and longitude coordinate pairs. Selecting the geocoder from the plurality of different geocoders may include selecting an external geocoding service from the set of external geocoding services as the selected geocoder.

In some embodiments, a system includes a set of processing units and a non-transitory computer-readable medium that stores instructions. The instructions cause at least one processing unit to receive, from a client device, a request to geo-enrich data that includes a set of data and a set of location data associated with the set of data. The instructions also cause the at least one processing unit to select a geocoder from a plurality of different geocoders based on the set of location data associated with the set of data. The instructions further cause the at least one processing unit to geo-enrich the set of location data using the selected geocoder.

In some embodiments, the instructions further cause the at least one processing unit to send the geo-enriched data to the client device. The request may specify to persist the geo-enriched data. The instructions may further cause the at least one processing unit to store the geo-enriched data for later use. In some embodiments, the request is a first request. The instructions further cause the at least one processing unit to receive, from the client device, a second request for the geo-enriched data. In response to the second request, the instructions also cause the at least one processing unit to retrieve the stored geo-enriched data and send the retrieved geo-enriched data to the client device.

The plurality of different geocoders may include an internal geocoder and a set of external geocoding services. The location data may include latitude and longitude coordinate pairs. Selecting the geocoder from the plurality of different geocoders may include selecting the internal geocoder as the selected geocoder. The location data may include data other than latitude and longitude coordinate pairs. Selecting the geocoder from the plurality of different geocoders may include selecting an external geocoding service from the set of external geocoding services as the selected geocoder.

The following detailed description and accompanying drawings provide a better understanding of the nature and advantages of the present invention.

DETAILED DESCRIPTION

Figure 1:
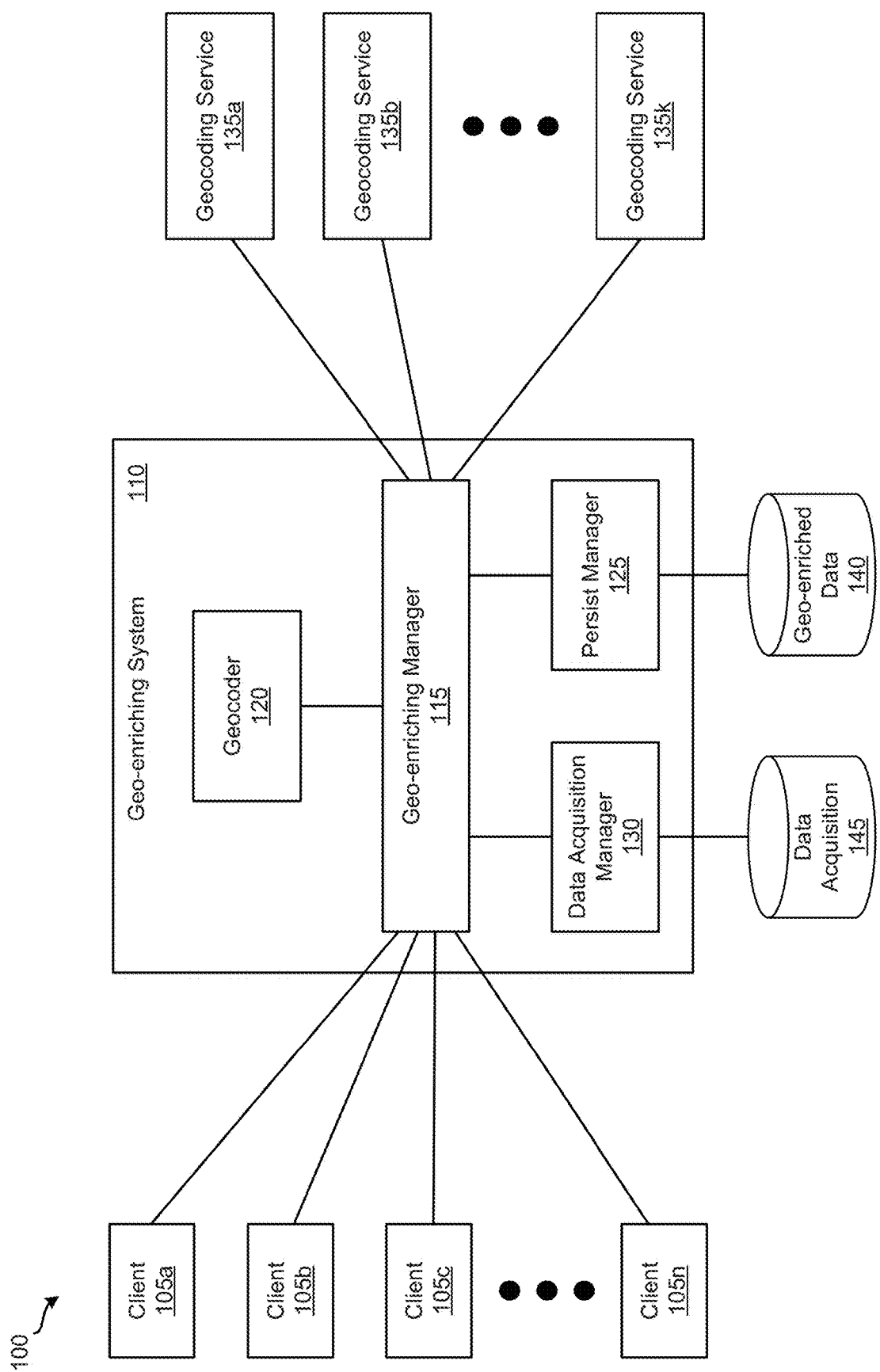
FIG. 1 illustrates a system 100 that includes a geo-enriching system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a geo-enriching system configured to geo-enrich data using several different geocoders. In some embodiments, data requested to be geo-enriched includes non-location data (e.g., financial data, demographic data, manufacturing data, customer data, employee data, etc.) and location data associated with the non-location data. The data requested to be geo-enriched may be referred to as raw data in some embodiments. The geo-enriching system may use different geocoders to geocode raw data based on the type of location data included in the raw data. In some instances, the geo-enriching system may return the geo-enriched data to the requestor. In other instances, the geo-enriching system may persist the geo-enriched data so that the geo-enriched data may be used and/or retrieved at a later time. In some embodiments, the geo-enriching system includes a mechanism for performing updates to persisted geo-enriched data.

In some embodiments, location data is data that describes a location, area, and/or region (e.g., a location, area, and/or region on Earth). Examples of location data may include address data, city data, state data, country data, postal zip code data, latitude and longitude data, etc., or a combination of any number of different types of location data (e.g., address data and city data, city data and state data, address data, etc.). In some embodiments, location data is textual data.

In some embodiments, geo-enriching data is associating non-location data with spatial data. For instance, data that includes non-location and location data associated with the non-location data may be geo-enriched by geocoding the location data. In some embodiments, geocoding location data is converting the location data to spatial data.

Spatial data may be data that defines the shape, size, position, and/or orientation of a geometry (e.g., a point, a line, an area, a region, or any combination thereof) in a defined space (e.g., the surface of the Earth). In some embodiments, a defined space in which geometries are defined is referred to as a spatial reference system (SRS). A particular defined space may be associated with a unique identifier referred to as a spatial reference identifier (SRID). Spatial data may be represented using a particular spatial data type (e.g., a point represented as an ST_point, a line represented as an ST_curve, an area represented as an ST_polygon, etc.). Spatial operations may be performed on spatial data such as calculating the intersection of spatial data (e.g., intersection of two polygons), determining whether spatial data (e.g., a point, a line, a polygon, or any combination therefore) is contained within another spatial data (e.g., a polygon), etc.

In some embodiments, certain operations may be performed on geo-enriched data that may otherwise be not possible, or slower, to perform on data that is not geo-enriched. For instance, map-based operations may be performed on geo-enriched data. Examples of map-based operations may include mapping geo-enriched data in a map visualization, performing map-based analytics on geo-enriched data, etc.

FIG. 1 illustrates a system 100 that includes a geo-enriching system according to some embodiments. As shown, system 100 includes client devices 105a-n, geo-enriching system 110, geocoding services 135a-k, geocoding data storage 140, and data acquisition storage 145. Client devices 105a-n are configured to access and communicate with geo-enriching system 110 (e.g., via a network). For instance, a user may use a client device 105 to send geo-enriching system 110 a request to geo-enrich data along with the data to geo-enrich or a data source that includes the data to geo-enrich. In some embodiments, a user of the client device 105 may also send geo-enriching system 110 a request to persist the geo-enriched data along with the request to geocode the data.

Geocoding data storage 140 is configured to store data that has been geo-enriched by geo-enriching system 110. Data acquisition storage 145 is configured to store data processed by data acquisition manager 130. Storages 140 and 145 may be a relational database managed by a database management system (DBMS) application (not shown) that operates on geo-enriching system 110. In some embodiments, storages 140 and 145 are implemented in a single physical storage while, in other embodiments, storages 140 and 145 may be implemented across several physical storages. While FIG. 1 shows storages 140 and 145 as external to geo-enriching system 110, one of ordinary skill in the art will appreciated that storages 140 and 145 may be included in geo-enriching system 110 in some embodiments.

As illustrated in FIG. 1, geo-enriching system 110 includes geo-enriching manager 115, geocoder 120, persist manager 125, and data acquisition manager 130. Geo-enriching manager 115 is responsible for handling requests to geo-enrich data from client devices 105a-n. In some embodiments, geo-enriching manager 115 may receive from a client device 105 a request to geo-enrich data and the data to geo-enrich. In other embodiments, geo-enriching manager 115 may receive from a client device 105 a request to geo-enrich data and a data source that includes data to geo-enrich. In some such other embodiments, geo-enriching manager 115 accesses the data source and retrieves the data to geo-enrich from the data source. In some embodiments, geo-enriching manager 115 may receive from a client device 105 data to be geo-enriched and a data source that includes data to geo-enrich along with a request to geo-enrich the data and the data in the data source. The request to geo-enrich data may specify one or more types of location data (e.g., address data; city data; address data, city data, and state data; latitude and longitude coordinate values; etc.) included in the location data.

As mentioned above, in some embodiments, the data to be geo-enriched includes non-location data and location data. In some such embodiments, geo-enriching manager 115 analyzes the location data and selects a geocoder to use to geocode the data based on the analysis of the location data. For example, geo-enriching manager 115 may select to use geocoder 120 to geocode the data when geo-enriching manager 115 determines that the location data includes latitude and longitude coordinate values. As another example, geo-enriching manager 115 may select one of the geocoding services 135 to geocode the data when geo-enriching manager 115 determines that the location data includes address data and/or postal zip code data. Once geo-enriching manager 115 selects a geocoder, geo-enriching manager 115 sends the data to the selected geocoder for the geocoder to geocode the data. When geo-enriching manager 115 receives the geo-enriched data from the selected geocoder, geo-enriching manager 115 sends the geo-enriched data to the client device 105 that requested for the geo-enriched data.

As mentioned above, a user of a client device 105 may send geo-enriching system 110 a request to geo-enrich data along with a request to persist the geo-enriched data. When geo-enriching manager 115 receives such requests, geo-enriching manager 115 geocodes the data in the manner described above. Geo-enriching manager 115 sends the geo-enriched data to persist manager 125 and instructs persist manager to store the geo-enriched data for later use and/or retrieval. Geo-enriching manager 115 may receive a reference (e.g., a name of a table in a database, a file location, etc.) to the stored geo-enriched data. Geo-enriching manager 115 then sends the reference to a client device 105 that requested for the data to be geo-enriched and persisted. In some embodiments, geo-enriching manager 115 also sends the geo-enriched data back to the client device 105.

In some embodiments, the data to be geo-enriched that geo-enriching system 110 receives from a client device 105 may be stored in a file. For example, a client device 105 may send geo-enriching manager 115 a spreadsheet file that stores the data to be geo-enriched in one or more tables. In some embodiments, the client device 105 sends the file to geo-enriching manager 115 in response to an operation performed by a user of the client device 105 on a graphical user interface (GUI) displayed on a display of the client device 105. As an example, the user may perform a drag and drop operation with the file on a map in the GUI displayed on the display of the client device 105. As another example, the user may select the file using a file selection user interface (UI) control included in the GUI displayed on the display of the client device 105. One of ordinary skill in the art will understand that a client device 105 may send the file in response to different inputs provided by the user of the client device 105 in different embodiments.

When geo-enriching manager 115 receives the file, geo-enriching manager sends the file to data acquisition manager 130 and instructs data acquisition manager 130 to process the file and store data in the file in data acquisition storage 145. Geo-enriching manager 115 then receives from data acquisition manager 130 a reference (e.g., a name of a table in a database, a file location, etc.) to data (which was the data stored in the file) stored in data acquisition storage 145 and a reference (e.g., a name of a table in a database, a file location, etc.) to metadata associated with the data stored in the data acquisition storage 145. In some embodiments, the metadata associated with the data includes data that specifies the type of data (e.g., location data, non-location data, location identifiers, etc.) stored in data acquisition storage 145. Geo-enriching manager 115 then sends the reference to the data stored in data acquisition storage 145 and the reference to the metadata to a geocoder that geo-enriching manage 115 selected in the same or similar manner described above. Geo-enriching manager 115 then sends the geo-enriched data to the requesting client device 105 and/or persists the geo-enriched data in the same or similar manner described above.

Geocoder 120 is configured to geocode location data. Geocoder 120 may receive from geo-enriching manager 110 location data and a request to geocode the location data. In some embodiments, the request specifies one or more types of the location data (e.g., address data; city data; address data, city data, and state data; latitude and longitude coordinate values; etc.). In response to the request, geocoder 120 geocodes the location data based on the specified one or more types of the location data and sends the geocoded data back to geo-enriching manager 115.

As mentioned above, location data is data that describes a location, area, and/or region. In some embodiments, geocoder 120 geocodes location data by converting the location data to spatial data. As explained above, spatial data may be data that defines a geometry in a defined space. For example, if a particular location data includes a pair of latitude and longitude coordinate values, geocoder 120 may geocode the particular location data by converting the latitude and longitude coordinate values to a point (e.g., an ST_point spatial data type) that defines the position of the latitude and longitude coordinate values on the surface of the Earth. As another example, if a particular location data includes a description of a city in the state of California (e.g., San Francisco, Calif.; Los Angeles, Calif.; Sacramento, Calif.; etc.), geocoder 120 may geocode the particular location data by converting the description of the city in the state of California to a polygon (e.g., an ST_polygon spatial data type) that defines the shape, size, position, and/or orientation of a boundary of the city on the surface of the Earth. As yet another example, if a particular location data includes an address of a house in the United States of America (e.g., 123 Main St., Anytown, Anystate USA), geocoder 120 may geocode the particular location data by converting the address of the house to a point (e.g., an ST_point spatial data type) that defines the position of the house on the surface of the Earth.

Persist manager 125 is responsible for handling requests to persist geo-enriched data. Persist manager 125 may receive from geo-enriching manager 115 geo-enriched data and instructions to persist the geo-enriched data. In response to the instruction, persist manager 125 stores the geo-enriched data in geo-enriched data storage 140, generates a reference (e.g., a name of a table in a database, a file location, etc.) to the stored geo-enriched data, and sends the generated reference to geo-enriching manager 115.

Data acquisition manager 130 is configured to process files of data. In some embodiments, data acquisition manager 130 receives from geo-enriching manager 115 a file of data and instructions to process the file and store data in the file in data acquisition storage 145. When data acquisition manager 130 receives such request and instruction, data acquisition manager 130 analyzes the data in the file and determines different types of data in the file.

In some instances, the data in the file is stored in a set of tables. In some such instances, data acquisition manager 130 determines one or more columns in the set of tables include non-location data, one or more columns in the set of tables include location data, one or more columns in the set of tables include location identifiers that uniquely identify each row of data. In some embodiments, data acquisition manager 130 determines types of data by analyzing column metadata associated with the columns of the set of tables.

Figure 2:
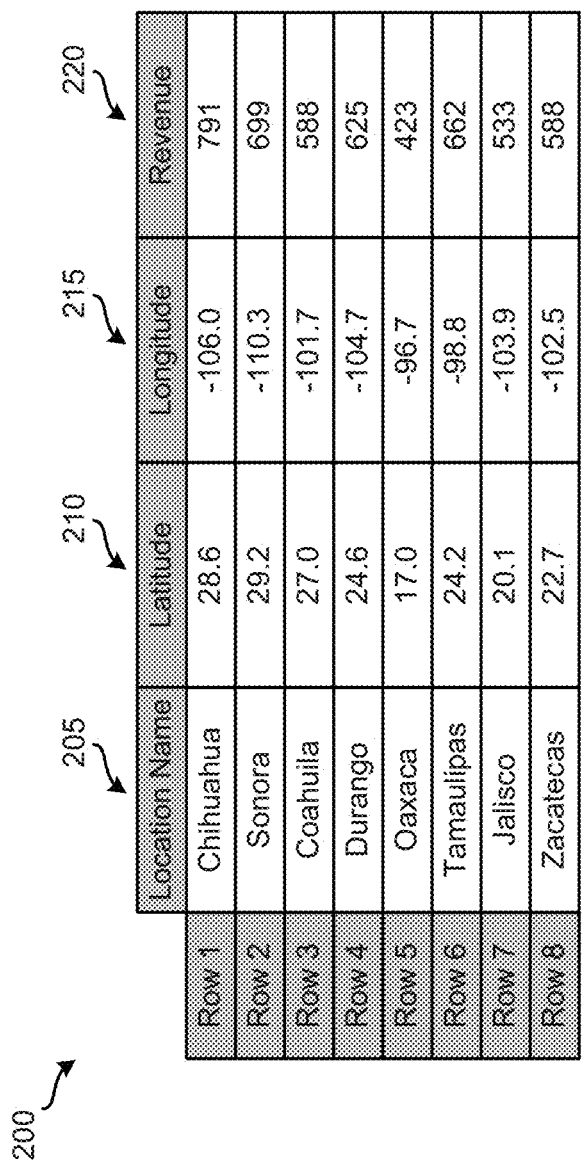
FIG. 2 illustrates an example table of data that is included in a file according to some embodiments.

An example data type determination operation will now be explained by reference to FIG. 2. FIG. 2 illustrates an example table 200 of data that is included in a file according to some embodiments. As shown, table 200 includes eight rows and four columns 205-220. Column 205 has column metadata "Location Name," column 210 has column metadata "Latitude," column 215 has column metadata "Longitude," and column 220 has column metadata "Revenue." Referring to FIG. 2 as an example, data acquisition manager 130 may determine column 210 with a column name of "Latitude" includes latitude location data, column 215 in table 200 with a column name of "Longitude" includes longitude location data, and column 205 in table 200 with a column name of "Location Name" includes location identifiers. In some embodiments, data acquisition manager 130 determines remaining columns that are not determined to include location data or location identifiers as columns that include non-location data. In this example, data acquisition manager 130 determines column 220 as the remaining column that includes non-location data.

For the example data type determination operation describe above, data acquisition manager 130 determines the type of data included in the columns based on the column metadata of the columns in the table. One of ordinary skill in the art will realize that data acquisition manager 130 may determine the type of data included in columns using additional and/or different techniques. For instance, in some embodiments, data acquisition manager 130 may analyze the data in a column to determine the type of data included in the column. Referring to FIG. 2 as an example, data acquisition manager 130 may determine the data in column 210 includes latitude location data because the values in column 210 all fall within the range of possible latitude values (e.g., −90 to 90, −85 to 85, etc.), the data in column 215 includes longitude location data because the values in column 215 all fall within the range of possible longitude values (e.g., −180 to 180), and the data in column 205 includes location identifiers because each of the values in column 205 are unique relative to one another.

After analyzing the data in the file and determining different types of data in the file, data acquisition manager 130 stores the data in a first table in data acquisition storage 145 and stores the determined data type of each column in a second table in data acquisition storage 145 that is associated with the first table. Data acquisition manager 130 then sends references to the first and second tables to geo-enriching manager 115.

Geocoding services 135a-k are external services that are configured to geocode location data. A geocoding service 135 may receive from geo-enriching manager 110 location data and a request to geocode the location data. As mentioned above, the request may specify one or more types of the location data In response to the request, the geocoding service 135 geocodes the location data based on the specified one or more types of the location data and sends the geocoded data back to geo-enriching manager 115. In some embodiments, each geocoding service 135a-k geocodes location data in the same or similar manner as that described above by reference to geocoder 120. Examples of geocoding service 135a-k include a geocoding service provided by HERE, a geocoding service provided by Environmental Systems Research Institute (ESRI), etc.

In some embodiments, geo-enriching system 110 is implemented on a cloud computing system as described below by reference to FIG. 8. The cloud computing system may include (e.g., host) applications and/or services that may be accessed by client devices 105a-n. In some such embodiments, geo-enriching manager 115 receives requests from such applications and/or services to geo-enrich data.

Figure 3:
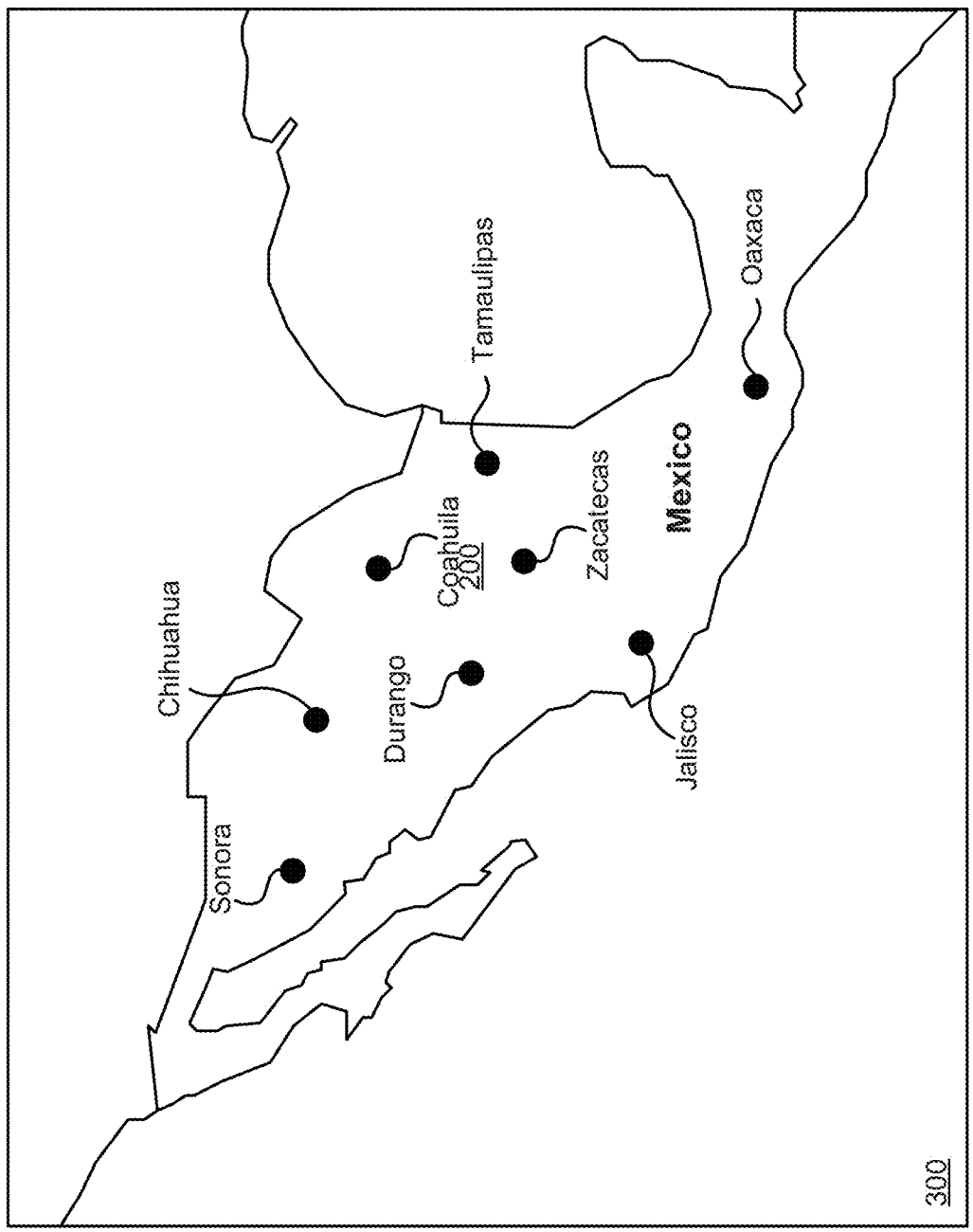
FIG. 3 illustrates an example map visualization according to some embodiments.

These applications and/or services send request to geo-enriching manager 115 in response to a user of a client device 105 interacting (e.g., through a web browser operating on the client device 105) with the applications and/or services. Accordingly, geo-enriching manager 115 sends the requested geo-enriched data to the requesting applications and/or services for the applications and/or services to use the geo-enriched data. Examples of such applications and/or services include analytics applications that map geo-enriched data on map visualizations, web service application programming interfaces (APIs), web applications, embedded map visualizations within applications, mobile applications, etc. FIG. 3 illustrates an example map visualization 300 according to some embodiments. For this example, map visualization includes a geo-enriched version of the data in table 200. In some embodiments, map visualization 300 is provided by an analytics application operating on geo-enriching system 110. As shown, map visualization 300 shows the geographical locations of locations in table 200.

Figure 4:
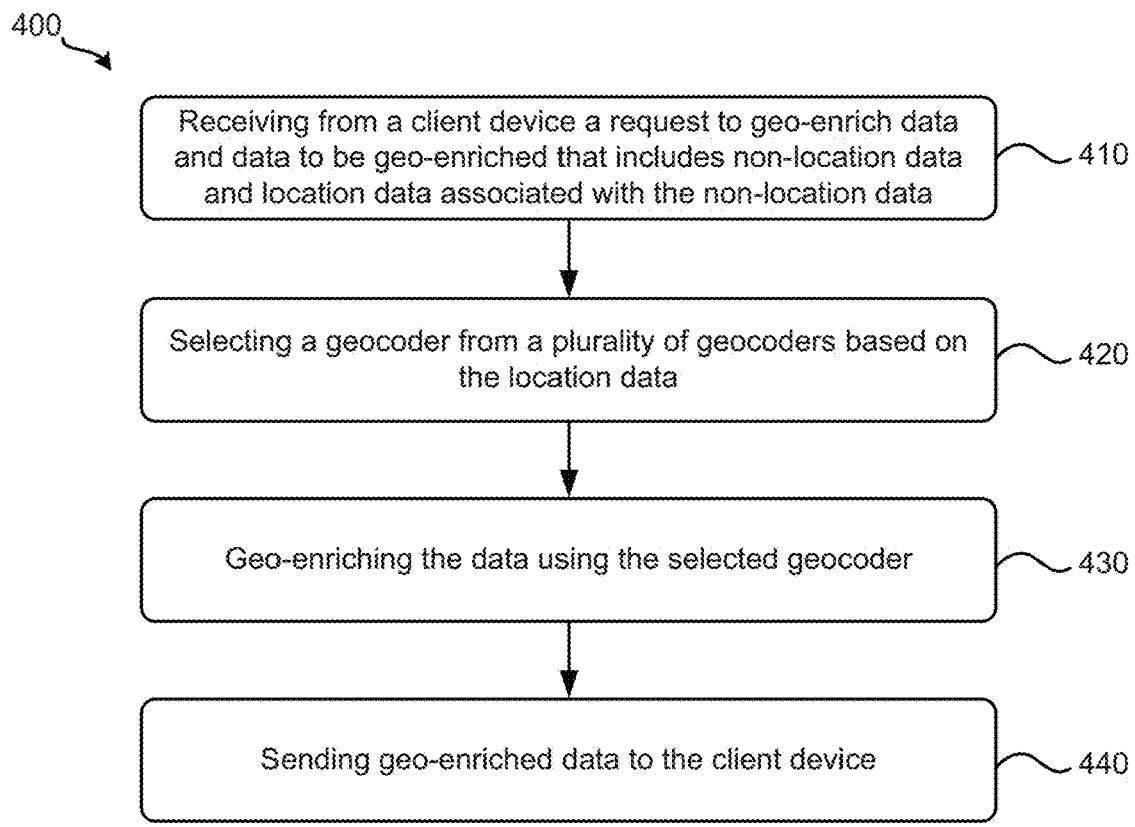
FIG. 4 illustrates a process for geo-enriching data according to some embodiments.

FIG. 4 illustrates a process 400 for geo-enriching data according to some embodiments. In some embodiments, geo-enriching system 110 performs process 400. Process 400 starts by receiving, at 410, from a client device (e.g., a client device 105) a request to geo-enrich data and data to be geo-enriched that includes non-location data and location data associated with the non-location data. In some embodiments, process 400 may receive a data source that includes the data to geo-enrich instead of the data to be geo-enriched itself. In some such embodiments, process 400 accesses the data source and retrieves the data to geo-enrich from the data source. In other embodiments, process 400 may receive data to be geo-enriched and a data source that includes data to be geo-enriched along with a request to geo-enrich the data and the data in the data source. The request may specify one or more types of location data (e.g., address data; city data; address data, city data, and state data; latitude and longitude coordinate values; etc.) included in the location data.

Next, process 400 selects, at 420, a geocoder from a plurality of geocoders (e.g., geocoder 120 and geocoding services 135a-k) based on the location data. In some embodiments, process 400 analyzes the location data and selects the geocoder based on the analysis of the location data. Referring to FIG. 1 as an example, process 400 may select geocoder 120 when process 400 analyzes the location data and determines that the location data includes latitude and longitude coordinate values. As another example, process 400 may select one of the geocoding services 135 when process 400 analyzes the location data and determines that the location data includes address data and/or postal zip code data.

Process 400 then geo-enriches, at 430, the data using the selected geocoder. As explained above, geo-enriching data is associating non-location data with spatial data. In some embodiments, process 400 geo-enriches the data by using the selected geocoder to converting the location data to spatial data. Since the location data is associated with the non-location, the geocoded location data (now spatial data) remains associated with the non-location data. Finally, process 400 sends, at 440, the geo-enriched data back to the client device.

Figure 5:
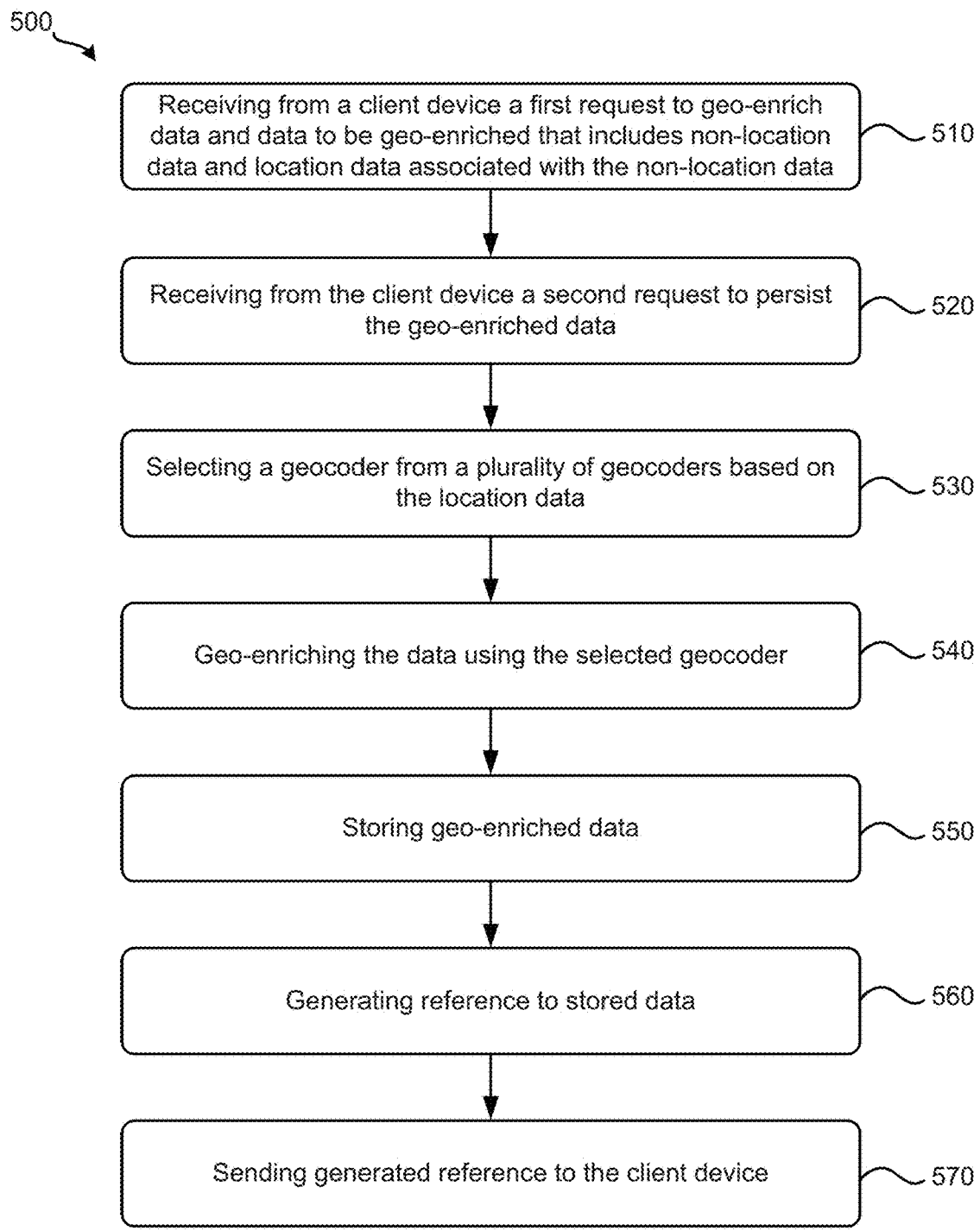
FIG. 5 illustrates a process for persisting geo-enriched data according to some embodiments.

FIG. 5 illustrates a process 500 for persisting geo-enriched data according to some embodiments. In some embodiments, geo-enriching system 110 performs process 500. Operation 510 is the same as operation 410 described above by reference to process 400. Next, process 500 receives, at 520, from the client device a second request to persist the geo-enrich data. Operations 530 and 540 are the same as operations 420 and 430, respectively, described above by reference to process 400.

After selecting a geocoder and geo-enriching the data using the selected geocoder, process 500 then stores, at 550, the geo-enriched data. Referring to FIG. 1 as an example, process 500 may store the geo-enriched data in geo-enriched data storage 140. Next, process 500 generates, at 560, a reference to the stored geo-enriched data. In some embodiments, the reference may be a name of a table in a database, a file location, etc. Finally, process 500 sends, at 570, the generated reference to the client device. This way, the client device may later use and/or retrieve the geo-enriched data by using the reference to the stored geo-enriched data.

As described above, geo-enriching manager 115 may receive from a client device 105 a request to geo-enrich data and a data source that includes the data to geo-enrich. The geo-enriching manager 115 may also receive a request to persist the geo-enriched data. In some instances, updates may be performed on the data source (e.g., new data is added to the data source) after data in the data source has been geo-enriched and persisted. In some such cases, geo-enriching manager 115 includes a mechanism for performing updates to persisted geo-enriched data.

Figure 6:
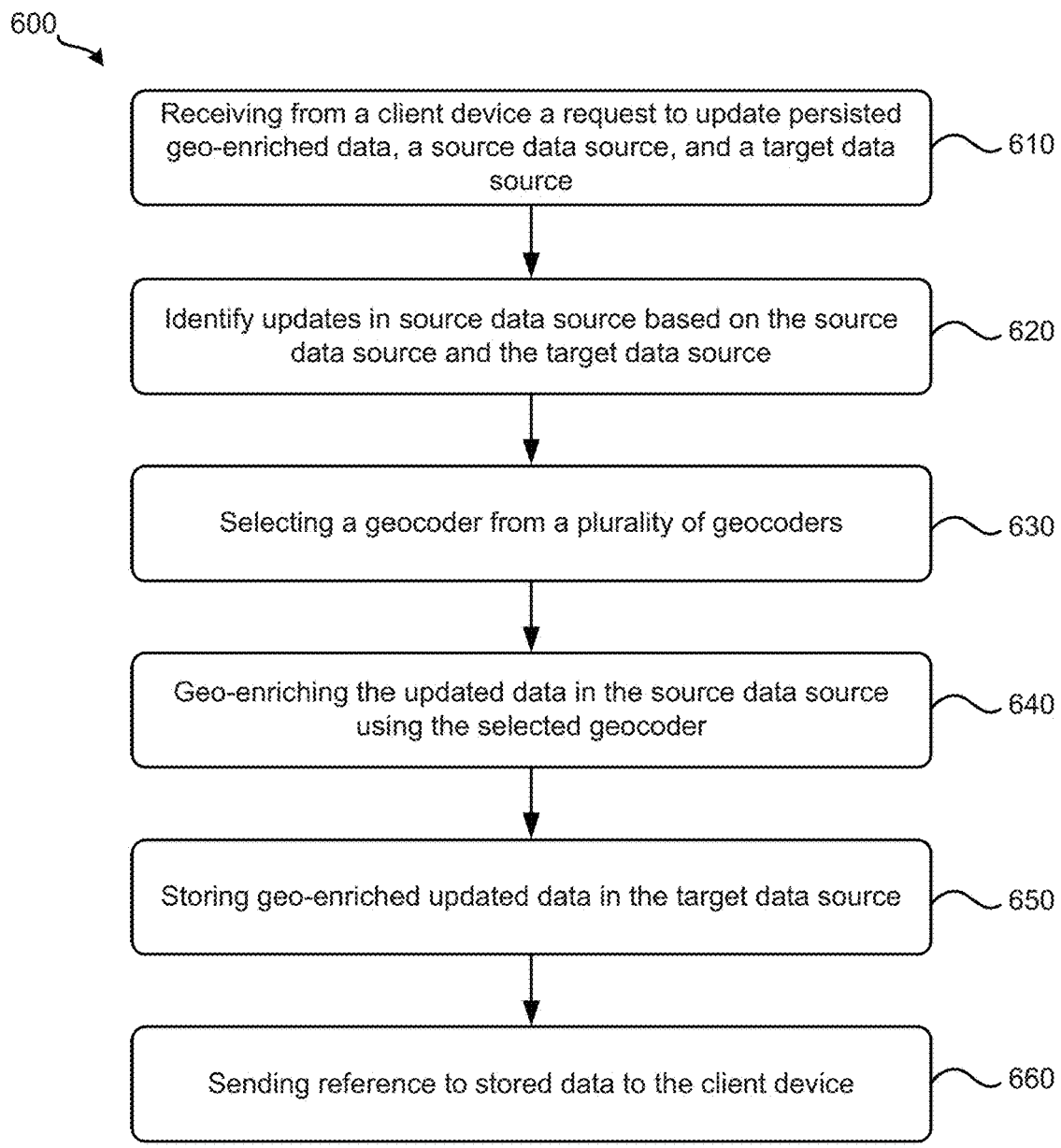
FIG. 6 illustrates a process for updating persisted geo-enriched data according to some embodiments.

FIG. 6 illustrates a process 600 for updating persisted geo-enriched data according to some embodiments. In some embodiments, geo-enriching system 110 performs process 600. Process 600 starts by receiving, at 610, a request to update persisted geo-enriched data, a source data source, and a target data source. The source data source (e.g., a name of a table in a database, a file location, etc.) is the data source that was previously used to geo-enrich and persist data in the target data source. The target data source (e.g., a name of a table in a database, a file location, etc.) stores data from the source data source that has been geo-enriched.

Next, process 600 identifies, at 620, updates in the source data source based on the source data source and the target data source. In some embodiments, process 600 identifies the updates in the source data source by comparing data in the source data source with data in the target data source and identifying the differences (e.g., new rows of data in the source data source, rows of data in the data source with updated values, etc.).

Operation 630 is the same as operation 420 describe above by reference to process 400. Operation 640 is similar to operation 430 described above by reference to process 400 except, at 640, process 600 only geo-enriches the identified updates in the source data source. Process 600 then stores, at 650, geo-enriched updated data in the target data source. For new data that has been added to the source data source, process 600 adds the geo-enriched new data to the target data source. For updates to existing data in the source data source, process 600 replaces the corresponding data in the target data source with the geo-enriched updated data. Finally, process 600 sends, at 660, a reference to the stored data to the client device. Since the target data source already stores data from the source data source that has been geo-enriched, process 600 sends the target data source to the client device.

FIGS. 4-6 illustrate processes that receive requests from a client device. As mentioned above, geo-enriching system 110 is, in some embodiments, implemented on a cloud computing system that may include applications and/or services accessed by client devices 105a-n. In some such embodiments, processes 400, 500, and 600 receive requests from such applications and/or services to geo-enrich data and persist geo-enriched data. In addition, processes 400, 500, and 600 send the requested geo-enriched data or references to persisted geo-enriched data to the requesting applications and/or services.

Figure 7:
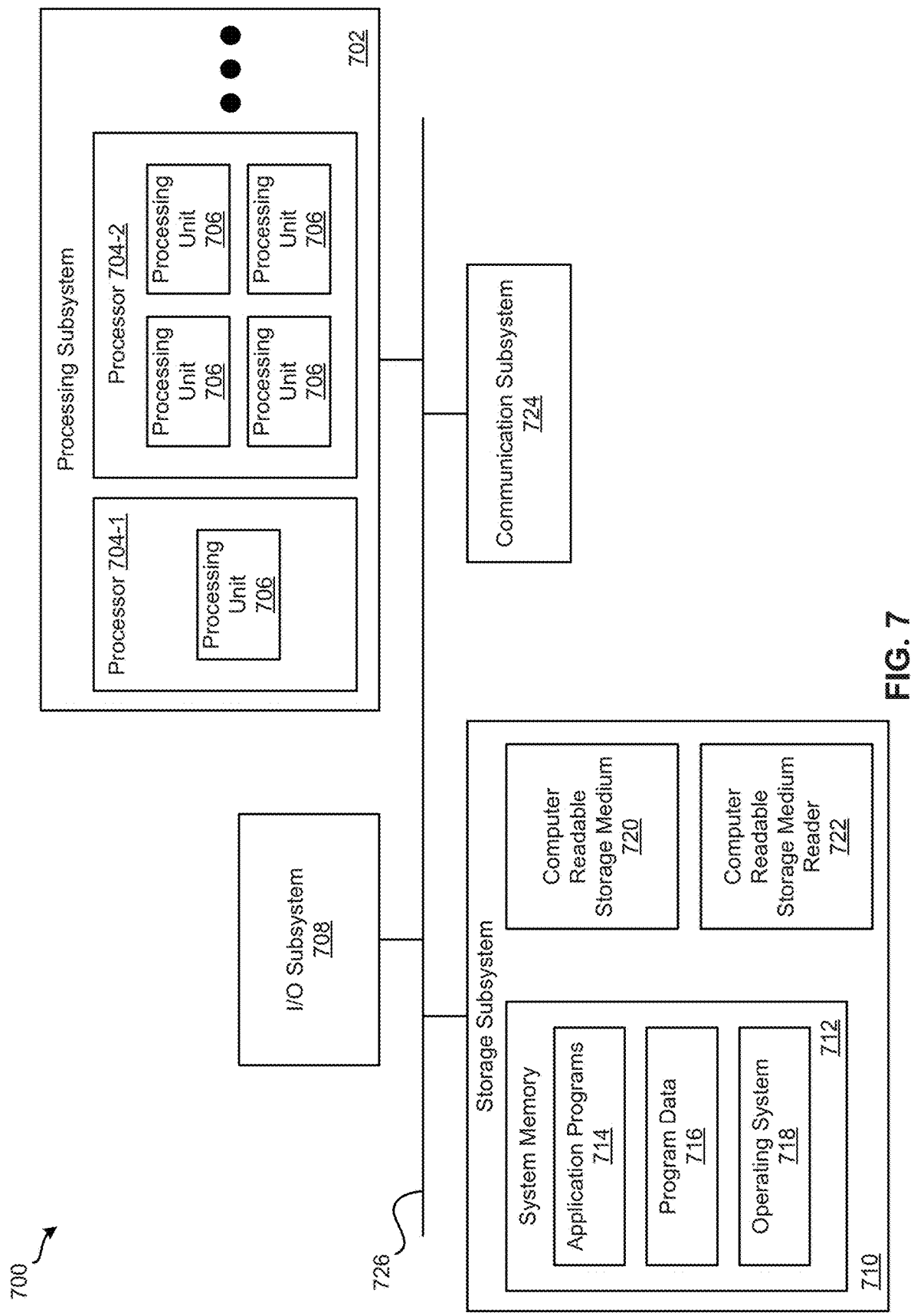
FIG. 7 illustrates an exemplary computer system, in which various embodiments may be implemented.

FIG. 7 illustrates an exemplary computer system 700, in which various embodiments may be implemented. For example, computer system 700 may be used to implement geo-enriching system 110 and one or more client devices 105a-n. Computer system 700 may be a desktop computer, a laptop, a server computer, or any other type of computer system or combination thereof. Computer system 700 can implement many of the operations, methods, and/or processes described above (e.g., processes 400, 500, and 600). As shown in FIG. 7, computer system 700 includes processing subsystem 702, which communicates, via bus subsystem 702, with input/output (I/O) subsystem 708, storage subsystem 710 and communication subsystem 724.

Bus subsystem 702 is configured to facilitate communication among the various components and subsystems of computer system 700. While bus subsystem 702 is illustrated in FIG. 7 as a single bus, one of ordinary skill in the art will understand that bus subsystem 702 may be implemented as multiple buses. Bus subsystem 702 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to processes 400, 500, 600, etc.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714, program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., geo-enriching manager 115, geocoder 120, persist manager 125, and data acquisition manager 130) and/or processes (e.g., processes 400, 500, and 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
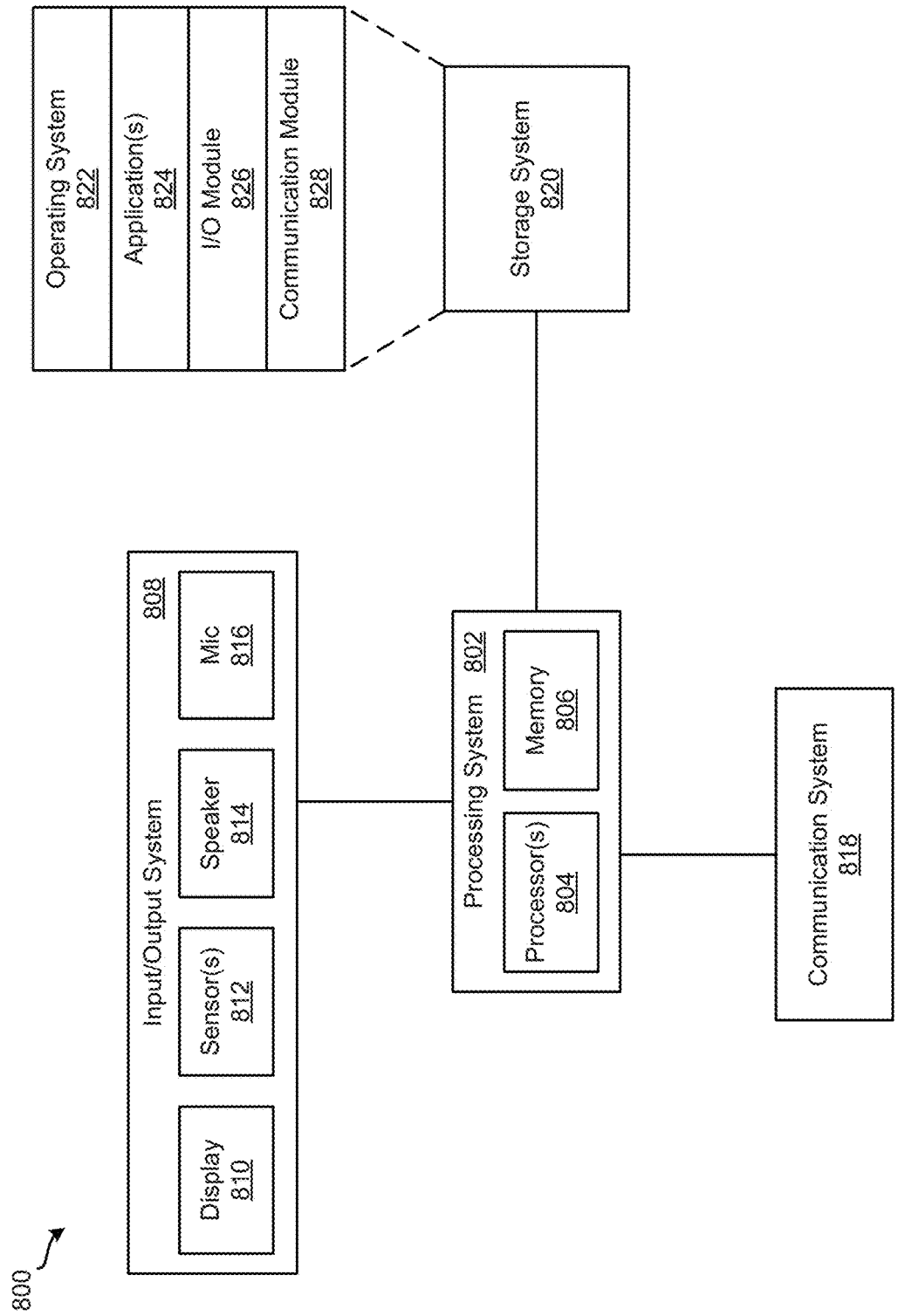
FIG. 8 illustrates an exemplary computing device, in which various embodiments may be implemented.

FIG. 8 illustrates an exemplary computing device 800, in which various embodiments may be implemented. For example, computing device 800 may be used to implement one or more client devices 105a-n. Computing device 800 may be a cellphone, a smartphone, a wearable device, an activity tracker or manager, a tablet, a personal digital assistant (PDA), a media player, or any other type of mobile computing device or combination thereof. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
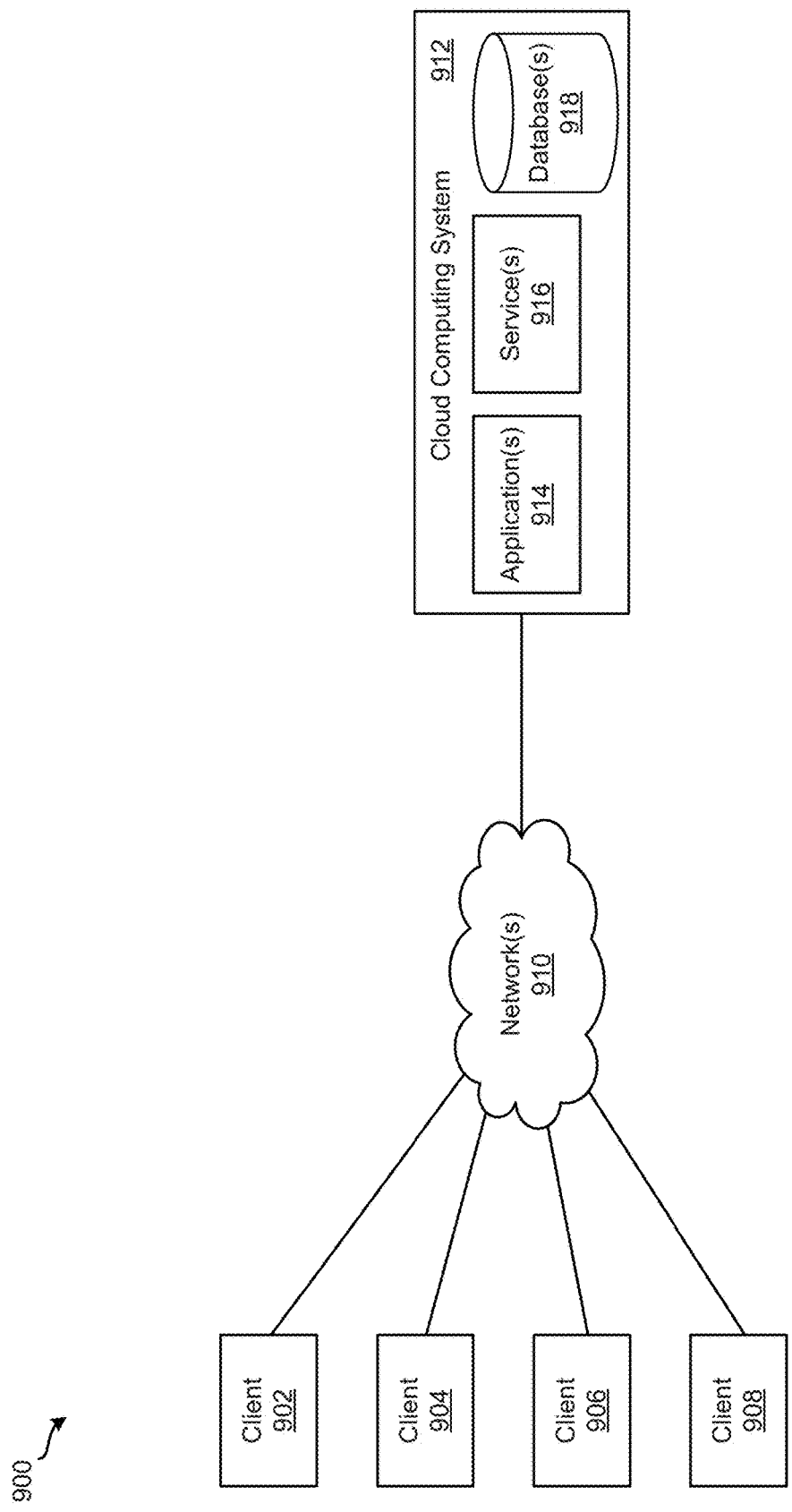
FIG. 9 illustrates system for implementing various embodiments described above.

FIG. 9 illustrates system 900 for implementing various embodiments described above. For example, cloud computing system 912 of system 900 may be used to implement geo-enriching system 110. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 900 is referred to as a "cloud service." Typically, servers and systems that make up cloud computing system 900 are different from the on-premises servers and systems of a customer. For example, cloud computing system 900 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages 140 and 145 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

receiving, from a client device, a set of tables and a request to geo-enrich data in the set of tables, the set of tables comprising a column configured to store a set of data, a set of columns configured to store a set of location data associated with the set of data, and a set of metadata associated with the set of columns, wherein each location data in the set of location data describes a location, area, or region;

analyzing the set of metadata associated with the set of columns to determine a type of location data that the set of columns is configured to store;

upon determining that the type of location data that the set of columns is configured to store is latitude and longitude data, selecting a first geocoder from a plurality of different geocoders;

upon determining that the type of location data that the set of columns is configured to store is data other than latitude and longitude data, selecting a second geocoder from the plurality of different geocoders; and geo-enriching the set of location data using the selected first or second geocoder by converting the set of location data to a set of spatial data, wherein each spatial data in the set of spatial data defines a geometry of the location, area, or region described by a corresponding location data in the set of location data.

2. The non-transitory machine-readable medium of claim 1, wherein the program further comprises a set of instructions for sending the geo-enriched data to the client device.

3. The non-transitory machine-readable medium of claim 1, wherein the request specifies to persist the geo-enriched data, wherein the program further comprises a set of instructions for storing the geo-enriched data for later use.

4. The non-transitory machine-readable medium of claim 3, wherein the request is a first request, wherein the program further comprises sets of instructions for:
receiving, from the client device, a second request for the geo-enriched data; and
in response to the second request, retrieving the stored geo-enriched data and sending the retrieved geo-enriched data to the client device.

5. The non-transitory machine-readable medium of claim 1, wherein receiving the set of tables from the client device comprises receiving a file that the client device received through a drag and drop operation performed with the file on a map in a graphical user interface (GUI) presented on a display of the client device, wherein the file includes the set of tables that comprises the set of data and the set of location data.

6. The non-transitory machine-readable medium of claim 1, wherein the first geocoder is an internal geocoder operating on the computing device, wherein the second geocoder is a geocoding service external to the computing device.

7. The non-transitory machine-readable medium of claim 1, wherein determining that the type of location data that the set of columns is configured to store is data other than latitude and longitude data comprises determining that the type of location data that the set of columns is configured to store is address data.

8. A method comprising:
receiving, from a client device, a set of tables and a request to geo-enrich data in the set of tables, the set of tables comprising a column configured to store a set of data, a set of columns configured to store a set of location data associated with the set of data, and a set of metadata associated with the set of columns, wherein each location data in the set of location data describes a location, area, or region;
analyzing the set of metadata associated with the set of columns to determine a type of location data that the set of columns is configured to store;
upon determining that the type of location data that the set of columns is configured to store is latitude and longitude data, selecting a first geocoder from a plurality of different geocoders; and
upon determining that the type of location data that the set of columns is configured to store is data other than latitude and longitude data, selecting a second geocoder from the plurality of different geocoders; and
geo-enriching the set of location data using the selected first or second geocoder by converting the set of location data to a set of spatial data, wherein each spatial data in the set of spatial data defines a geometry of the location, area, or region described by a corresponding location data in the set of location data.

9. The method of claim 8 further comprising sending the geo-enriched data to the client device.

10. The method of claim 8, wherein the request specifies to persist the geo-enriched data, wherein the method further comprises storing the geo-enriched data for later use.

11. The method of claim 10, wherein the request is a first request, wherein the method further comprises:
receiving, from the client device, a second request for the geo-enriched data; and
in response to the second request, retrieving the stored geo-enriched data and sending the retrieved geo-enriched data to the client device.

12. The method of claim 8, wherein receiving the set of tables from the client device comprises receiving a file that the client device received through a drag and drop operation performed with the file on a map in a graphical user interface (GUI) presented on a display of the client device, wherein the file includes the set of tables that comprises the set of data and the set of location data.

13. The method of claim 8, wherein the first geocoder is an internal geocoder operating on the computing device, wherein the second geocoder is a geocoding service external to the computing device.

14. The method of claim 8, wherein determining that the type of location data that the set of columns is configured to store is data other than latitude and longitude data comprises determining that the type of location data that the set of columns is configured to store is address data.

15. A system comprising:
a set of processing units; and
a non-transitory computer-readable medium storing instructions that when executed by at least one processing unit in the set of processing units cause the at least one processing unit to:
receive, from a client device, a set of tables and a request to geo-enrich data in the set of tables, the set of tables comprising a column configured to store a set of data, a set of columns configured to store a set of location data associated with the set of data, and a set of metadata associated with the set of columns, wherein each location data in the set of location data describes a location, area, or region;
analyze the set of metadata associated with the set of columns to determine a type of location data that the set of columns is configured to store;
upon determining that the type of location data that the set of columns is configured to store is latitude and longitude data, select a first geocoder from a plurality of different geocoders;
upon determining that the type of location data that the set of columns is configured to store is data other than latitude and longitude data, select a second geocoder from the plurality of different geocoders; and
geo-enrich the set of location data using the selected first or second geocoder by converting the set of location data to a set of spatial data, wherein each spatial data in the set of spatial data defines a geometry of the location, area, or region described by a corresponding location data in the set of location data.

16. The system of claim 15, wherein the instructions further cause the at least one processing unit to send the geo-enriched data to the client device.

17. The system of claim 15, wherein the request specifies to persist the geo-enriched data, wherein the instructions further cause the at least one processing unit to store the geo-enriched data for later use.

18. The system of claim 17, wherein the request is a first request, wherein the instructions further cause the at least one processing unit to:
receive, from the client device, a second request for the geo-enriched data; and in response to the second request, retrieve the stored geo-enriched data and send the retrieved geo-enriched data to the client device.

19. The system of claim 15, wherein the first geocoder is an internal geocoder operating on the computing device, wherein the second geocoder is a geocoding service external to the computing device.

20. The system of claim 15, wherein determining that the type of location data that the set of columns is configured to store is data other than latitude and longitude data comprises determining that the type of location data that the set of columns is configured to store is address data.

* * * * *